(12) United States Patent
Jiang et al.

(10) Patent No.: US 10,007,107 B2
(45) Date of Patent: Jun. 26, 2018

(54) LIGHT VALVE AND DISPLAY DEVICE

(71) Applicants: Shenzhen China Star Optoelectronics Technology Co., Ltd., Shenzhen, Guangdong (CN); Wuhan China Star Optoelectronics Technology Co., Ltd., Wuhan, Hubei (CN)

(72) Inventors: Yurui Jiang, Guangdong (CN); De-Jiun Li, Guangdong (CN); Hongqing Cui, Guangdong (CN)

(73) Assignees: Shenzhen China Star Optoelectronics Technology Co., Ltd, Shenzhen, Guangdong (CN); Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 288 days.

(21) Appl. No.: 14/893,880

(22) PCT Filed: Jul. 7, 2015

(86) PCT No.: PCT/CN2015/083438
§ 371 (c)(1),
(2) Date: Nov. 24, 2015

(87) PCT Pub. No.: WO2016/197428
PCT Pub. Date: Dec. 15, 2016

(65) Prior Publication Data
US 2017/0192223 A1    Jul. 6, 2017

(30) Foreign Application Priority Data

Jun. 12, 2015 (CN) .......................... 2015 1 0326084

(51) Int. Cl.
*G02B 26/02* (2006.01)
*G02F 1/1335* (2006.01)
*F21V 8/00* (2006.01)

(52) U.S. Cl.
CPC ........... *G02B 26/02* (2013.01); *G02B 6/0055* (2013.01); *G02F 1/133504* (2013.01);
(Continued)

(58) Field of Classification Search
None
See application file for complete search history.

(56) References Cited

U.S. PATENT DOCUMENTS

| 2006/0220040 A1* | 10/2006 | Suzuki | ................ G02B 6/0043 257/89 |
| 2010/0142024 A1* | 6/2010 | Kim | ....................... G02B 26/02 359/230 |
| 2016/0004067 A1* | 1/2016 | Zhao | .................. G02B 26/0841 359/316 |

* cited by examiner

Primary Examiner — Dennis Y Kim
(74) Attorney, Agent, or Firm — Andrew C. Cheng

(57) ABSTRACT

The present invention provides a light valve device, comprising a driving substrate having a shading zone and a photic zone, a shading unit, and the shading unit comprises a first shading plate, two driving units, and second shading plates respectively connected to the two driving units, and the driving unit and the first shading plate are fixed in the shading zone adjacent to the driving substrate, and the first shading plate is between the two driving units, and the driving unit can drive the two second shading plates close to the first shading plate to make the second shading plate face the photic zone of the driving substrate for preventing light entering the driving substrate. By locating the light valve device under the sub pixel, the dynamic contrast can be raised to promote the display effect.

10 Claims, 3 Drawing Sheets

(52) U.S. Cl.
CPC .. *G02F 1/133512* (2013.01); *G02F 1/133514* (2013.01); *G02F 1/133528* (2013.01); *G02F 2001/133507* (2013.01); *G02F 2201/121* (2013.01)

LIGHT VALVE AND DISPLAY DEVICE

CROSS REFERENCE

This application claims the priority of Chinese Patent Application No. 201510326084.2, entitled "Light valve and display device", filed on Jun. 12, 2015, the disclosure of which is incorporated herein by reference in its entirety.

FIELD OF THE INVENTION

The present invention relates to a microelectromechanical system display technology field, and more particularly relates to a light valve and a display device.

BACKGROUND OF THE INVENTION

At present, the main structure of the LCD panel on the market is shown in FIG. 1, and comprises a backlight source 1, a light guide plate 2, a brightness enhancement film 3, a lower polarizer 4, a TFT substrate 5, a liquid crystal layer 6, a color filter 7, an upper polarizer 8 and a reflective sheet 9. The voltage applied to the liquid crystal layer is controlled for manipulating the rotations of the liquid crystal molecules. Thus, a small angle change occurs to the polarization direction of the linearly polarized light generated with the light emitted by the backlight passing through the lower polarizer. The light passes through the color filter and forms color of various colors. Because the polarization direction of the light and the transmission axis of the upper polarizer have different included angles, the intensity of the emitting light can be controlled to form the display image that we want.

However, in prior arts, the liquid crystal itself in the liquid crystal display does not illuminate and has to rely on the backlight to provide the light source. With some reasons that the orientations of the liquid crystal molecules cannot perfectly satisfy the design requirements, as showing the black image, the pixels cannot be completely off, and some light still exiting out from the panel, which results in that the contrast cannot be reduced and the requirement of high quality from the consumers cannot be satisfied.

SUMMARY OF THE INVENTION

An objective of the present invention is to provide a light valve using MEMS to raise the dynamic contrast of the display device for enhancing display effect.

Another objective of the present invention is to provide a display device using the aforesaid light valve.

For realizing the aforesaid objective, the technical solution provided by the embodiments of the present invention is:

the light valve device of the present invention comprises a driving substrate having a shading zone and a photic zone, a shading unit, and the shading unit comprises a first shading plate, two driving units, and second shading plates respectively connected to the two driving units, and the driving unit and the first shading plate are fixed in the shading zone adjacent to the driving substrate, and the first shading plate is between the two driving units, and the driving unit can drive the two second shading plates close to the first shading plate to make the second shading plate face the photic zone of the driving substrate for preventing light entering the driving substrate.

The light valve device further comprises a swing arm, and the second shading plate and the driving unit are connected with the swing arm, and the driving unit drives the swing arm to rotate the second shading plate in a facing region of the shading zone and a facing region of the photic zone to accomplish state switch of the light valve.

A high scattering coated layer is coated on the shading plate, the driving unit and surfaces of the swing arm to raise a light use efficiency.

The present invention further provides a display panel comprising common electrode lines and a plurality of sub pixels, wherein each sub pixel comprises a light valve device, and the light valve device comprises a driving substrate having a shading zone and a photic zone, a shading unit, and the shading unit comprises a first shading plate, two driving units, and second shading plates respectively connected to the two driving units, and the driving unit and the first shading plate are fixed in the shading zone adjacent to the driving substrate, and the first shading plate is between the two driving units, and the driving unit can drive the two second shading plates close to the first shading plate to make the second shading plate face the photic zone of the driving substrate for preventing light entering the driving substrate. The sub pixel further comprises a thin film transistor, a drain of the thin film transistor is coupled to an input end of the driving unit and an output end of the driving unit is coupled to the common electrode line.

The light valve device further comprises a swing arm, and the second shading plate and the driving unit are connected with the swing arm, and the driving unit drives the swing arm to rotate the second shading plate in a facing region of the shading zone and a facing region of the photic zone to accomplish state switch of the light valve.

A high scattering coated layer is coated on the shading plate, the driving unit and surfaces of the swing arm to raise a light use efficiency.

The display panel further comprises a color filter, a brightness enhancement film and a lower polarizer, and the lower polarizer is located between the color filter and the brightness enhancement film, and the light valve device is located between the brightness enhancement film and the lower polarizer.

The color filter comprises black zones distributed in matrix, and the shading zone of the driving substrate is oppositely located to the black zone.

The display panel further comprises a color filter, a brightness enhancement film and a light guide plate, and the brightness enhancement film is located between the color filter and the light guide plate, and the light valve device is located between the brightness enhancement film and the light guide plate.

The color filter comprises black zones distributed in matrix, and the shading zone of the driving substrate is oppositely located to the black zone.

The display panel further comprises a color filter, a light guide plate and a reflective sheet, and the light guide plate is located between the color filter and the reflective sheet, and the light valve device is located between the reflective sheet and the light guide plate.

The color filter comprises black zones distributed in matrix, and the shading zone of the driving substrate is oppositely located to the black zone.

The embodiments of the present invention have advantages or benefits:

By the method of locating MEMS light valve in each sub pixel, the present invention realizes the control to the backlight in each sub pixel for achieving the objective of promoting the dynamic contrast of each sub pixel and thus, promoting the display effect of the display device.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Figure 1:
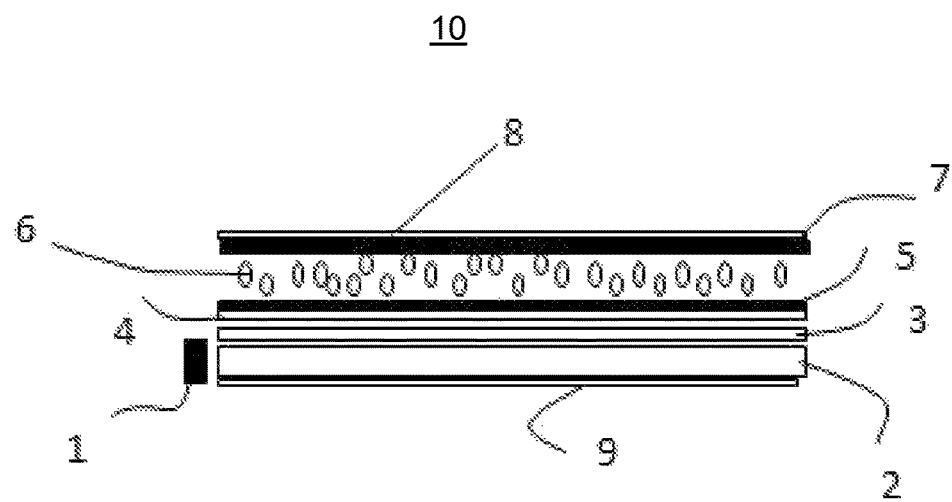
FIG. 1 is a structural diagram of a LED panel structure according to prior art.
Figure 2:
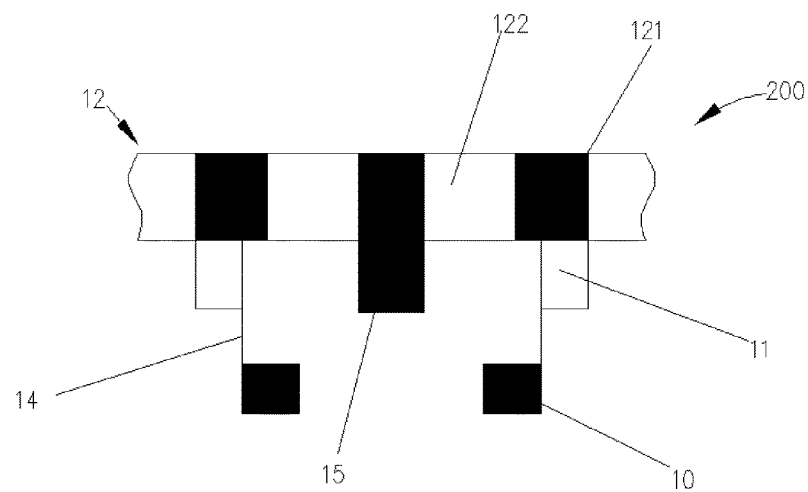
FIG. 2 is an enlarged diagram of a light valve in close state according to the present invention.

Please refer to FIG. 2. The light valve device 200 comprises a driving substrate 12. A partial zone (photic zone 122) on the driving substrate 12 is photic, and other zone (shading zone 121, covered with a black matrix) is opaque. The shading zone 121 and the photic zone 122 are located in space and alternately distributed. The shading zone 121 is employed to stop the light pass through. The light at the photic zone 122 can passes through the driving substrate 12. The light valve device 200 further comprises a shading unit (not numbered). The shading unit comprises a driving unit 11, a first shading plate 15, and two second shading plates 10, and the driving unit 11 and the first shading plate 15 are fixed in the shading zone 121 of the driving substrate 12, and the second shading plate 10 is connected to the driving unit 11, and the first shading plate 15 is located between the two second shading plate 10.

Figure 3:
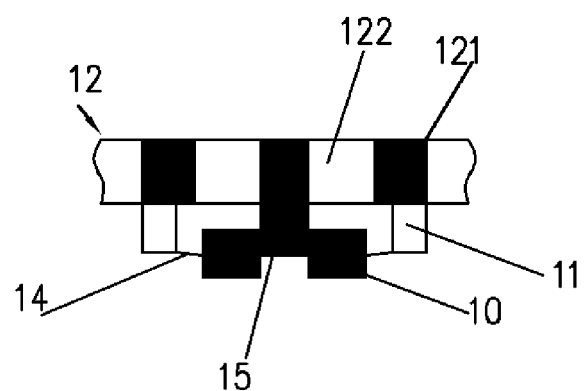
FIG. 3 is an enlarged diagram of the light valve according to the embodiment of the present invention.

Each light valve 200 corresponds to one sub pixel. As the sub pixel corresponded with two adjacent photic zone 122 needs the backlight to penetrate, the second shading plate is located in the shading zone 121. i.e. the light valve device 200 is in on state. The backlight can directly enter the driving substrate 12 through the two photic zone 122, and the pixel does not show black; please refer to FIG. 3, as the sub pixel corresponded with the light valve 200 needs to show black, with being driven by the driving unit 11, the two second shading plates 10 get close to the first shading plate 15. Then, the second shading plate 10 right faces the photic zone 122 for preventing the backlight entering the driving substrate 12 through the phtoic zone 122, i.e. the light valve device 200 is in off state. The sub pixel corresponded with the light valve 200 is completely off to form high contrast with the periphery to promote the display effect.

Furthermore, the second shading plate 10 and the driving unit 11 can be connected with a swing arm 14.

The swing arm 14 can use heat induced deformation element (such as shape memory alloy), electricity induced deformation element to be the main component. The swing arm drives the second shading plate 10 to rotate. Furthermore, for reducing the light energy loss and promoting the light use efficiency, a high scattering coated layer is coated on the first shading plate 15, the two second shading plates 10 and the swing arm 14 to raise a light use efficiency to reflect the light emitting to the coated layer back to the backlight path to reduce the light energy loss.

Figure 4:
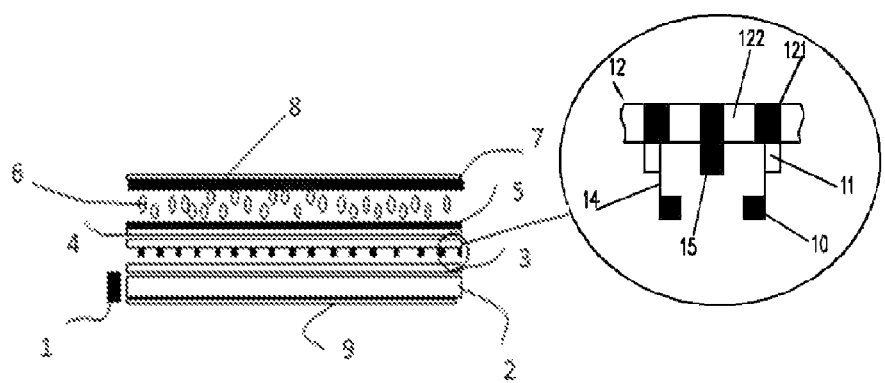
FIG. 4 is a diagram of a display device of the second kind having the light valve shown in FIG. 2.
Figure 5:
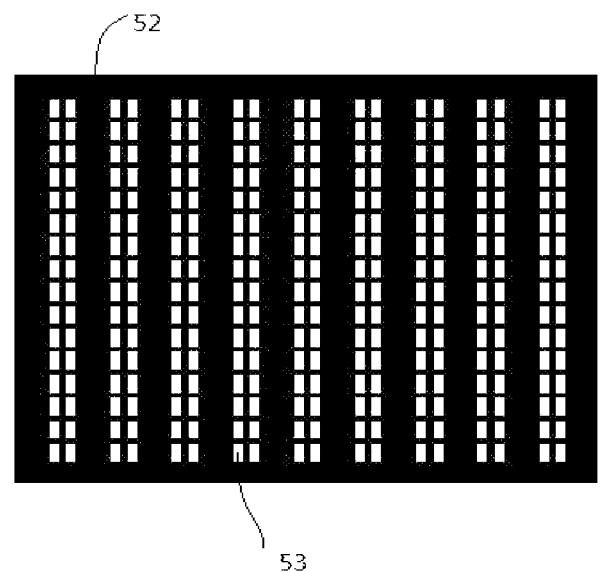
FIG. 5 is a diagram of a color filter black matrix according to the present invention.

Please refer to FIG. 4. This embodiment further provides a display device 100, comprising a plurality of sub pixels. The sub pixels can be various colors. Each sub pixel comprises a light valve, and at least a portion of the light valves is the aforesaid light valve device 200. The display device 100 comprises an upper polarizer 8, a color filter 7, a liquid crystal layer 6, a TFT substrate 5, a lower polarizer 4, a light valve device 200, a brightness enhancement film 3, a light guide plate 2 and a reflective sheet 9 from top to bottom in sequence. The backlight source 1 is located at the lateral side of the light guide plate 2. The light valve device 200 is located between the brightness enhancement film 3 and the lower polarizer 4. The color filter 1 is employed to achieve the colorization of the image after the light emitted from the backlight module passes through the color filter 1. The color filter 1 comprises a RGB color film layer (i.e. red color film, green color film and blue color film) (not shown) and a black zone distributed in matrix (black matrix) (not numbered). Please refer to FIG. 5. The black matrix further comprises a plurality of black matrix elements 52. The plurality of black matrix elements 52 are located on the color filter 1 spaced with certain distances. The shading zone 121 of the driving substrate 12 faces the black matrix, and the photic zone 122 of the driving substrate 12 faces the spaces 53 (i.e. the photic zone on the color filter 1) among the black matrix elements. Obviously, the amount, dimensions, shapes and positions of the shading zones 121 and the photic zones 122 of the driving substrate 12 match with the black matrix elements 52 and the spaces 53 of the color filter 1.

The display device 100 further comprises common electrode lines (now shown), a plurality of gate lines (not shown) and data lines (not shown) which intersect with one another. Each intersecting location of the gate lines and data lines is a pixel. The sub pixel further comprises a thin film transistor, and a gate of the thin film transistor is coupled to the gate line, and a source is coupled to the data line, and the input end of the driving unit 11 is coupled to the drain of the thin film transistor, and the output end is coupled to the common electrode line. By providing the driving signal to the driving unit 11 through the thin film transistor, the display contents of the respective sub pixels can be independently controlled.

Correspondingly, the shading zone 121 of the driving substrate 12 can be any opaque structure. However, with consideration in aspects of weight, cost technology maturity level, the black matrix is preferred. That is to say, the black matrix material in the color filter 1 can be employed to be the shading zone 121. The black matrix material can be metal of resin of which the opacity is stronger.

Figure 6:
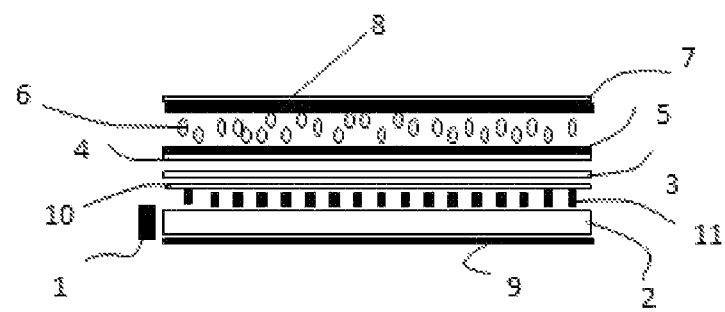
FIG. 6 is a diagram of a display device of the second kind having the light valve shown in FIG. 2.

Please refer to FIG. 6. In the second embodiment of the display device 100, the light valve device 200 is located between the brightness enhancement film 3 and the light guide plate 2. The working principle is similar with the display device 100 in the first embodiment. The repeated description is omitted here.

Figure 7:
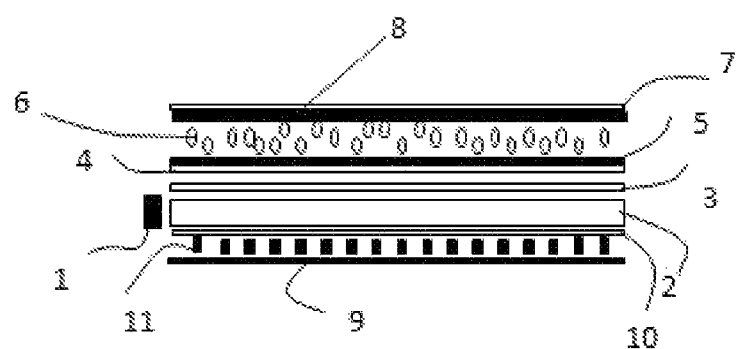
FIG. 7 is a diagram of a display device of the third kind having the light valve shown in FIG. 2.

Please refer to FIG. 7. In the third embodiment of the of the display device 100, the light valve device 200 is located between the reflective sheet 9 and the light guide plate 2. When the sub pixel needs to show black, with being driven by the driving unit 11, the two second shading plates 10 get close to the first shading plate 15 to make the second shading plate 10 face the photic zone 122 for preventing the backlight entering the reflective sheet 9 through the phtoic zone 122, and thus, the sub pixel here shows black.

Above are embodiments of the present invention, which does not limit the scope of the present invention. Any modifications, equivalent replacements or improvements within the spirit and principles of the embodiment described above should be covered by the protected scope of the invention.

What is claimed is:

1. A light valve device, comprising a driving substrate having a shading zone and a photic zone, wherein the light valve device further comprises a shading device, which comprises a first shading plate, two driving devices, and two second shading plates respectively corresponding to and connected to the two driving devices, and the driving unit devices and the first shading plate are fixed to the driving substrate and adjacent to the shading zone, and the first shading plate is between the two driving devices, wherein the two driving devices respectively and selectively drive the two second shading plates close to the first shading plate to make the second shading plate face the photic zone of the driving substrate for preventing light from entering the driving substrate;

wherein a swing arm is connected between each of the driving devices and the second shading plate corresponding thereto such that the driving devices drives the swing arm to rotate the second shading plate in a first region of facing the shading zone and a second region of facing the photic zone.

2. The light valve device according to claim 1, wherein a high scattering coated layer is coated on each of the shadings plates, each of the driving devices and surfaces of each of the swing arms to raise a light use efficiency.

3. A display panel comprising common electrode lines and a plurality of sub pixels, wherein each of the plurality of sub pixels comprises a light valve device, which comprises a driving substrate having a shading zone and a photic zone, a shading unit comprising a first shading plate, two driving devices, and two second shading plates respectively corresponding to and connected to the two driving devices, and the driving devices and the first shading plate are fixed to the driving substrate and adjacent to the shading zone, and the first shading plate is between the two driving devices, wherein the two driving devices respectively and selectively drive the two second shading plates close to the first shading plate to make the second shading plate face the photic zone of the driving substrate for preventing light from entering the driving substrate;

wherein a swing arm is connected between each of the driving devices and the second shading plate corresponding thereto such that the driving devices drives the swing arm to rotate the second shading plate in a first region of facing the shading zone and a second region of facing the photic zone.

4. The display panel according to claim 3, wherein a high scattering coated layer is coated on each of the shadings plates, each of the driving devices and surfaces of each of the swing arms to raise a light use efficiency.

5. The display panel according to claim 3, wherein the display panel further comprises a color filter, a brightness enhancement film and a lower polarizer, and the lower polarizer is located between the color filter and the brightness enhancement film, and the light valve device is located between the brightness enhancement film and the lower polarizer.

6. The display panel according to claim 5, wherein the color filter comprises black zones distributed in matrix, and the shading zone of the driving substrate is oppositely located to the black zone.

7. The display panel according to claim 3, wherein the display panel further comprises a color filter, a brightness enhancement film and a light guide plate, and the brightness enhancement film is located between the color filter and the light guide plate, and the light valve device is located between the brightness enhancement film and the light guide plate.

8. The display panel according to claim 7, wherein the color filter comprises black zones distributed in matrix, and the shading zone of the driving substrate is oppositely located to the black zone.

9. The display panel according to claim 3, wherein the display panel further comprises a color filter, a light guide plate and a reflective sheet, and the light guide plate is located between the color filter and the reflective sheet, and the light valve device is located between the reflective sheet and the light guide plate.

10. The display panel according to claim 9, wherein the color filter comprises black zones distributed in matrix, and the shading zone of the driving substrate is oppositely located to the black zone.

* * * * *